Nov. 18, 1947. B. D. H. TELLEGEN 2,431,151
AMPLIFIER CIRCUIT
Filed March 23, 1943
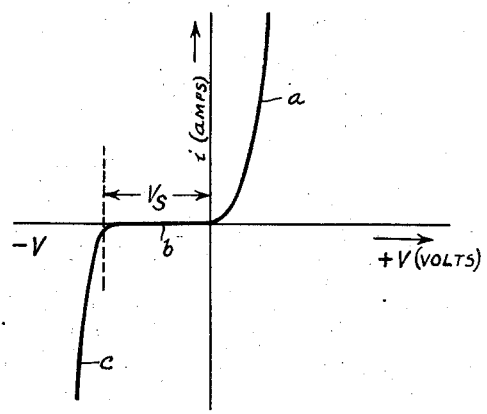
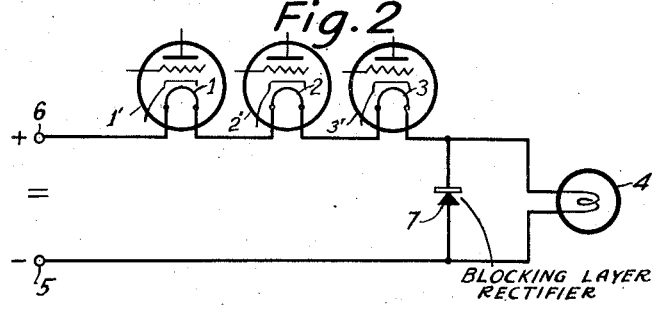
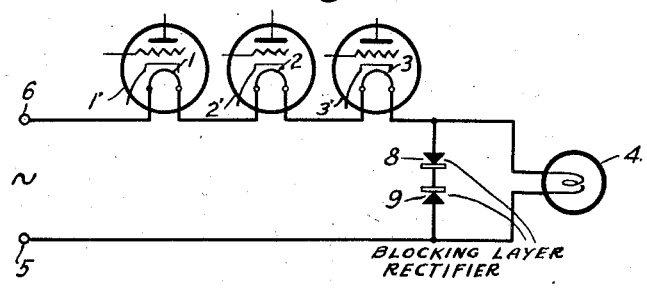
INVENTOR
BERNARDUS D. H. TELLEGEN
BY
ATTORNEY Patented Nov. 18, 1947

2,431,151

UNITED STATES PATENT OFFICE 2,431,151

AMPLIFIER CIRCUITS

Bernardus Dominicus Hubertus Tellegen, Eindhoven, Netherlands, assignor to Hartford National Bank and Trust Company, Hartford, Conn., as trustee Application March 23, 1943, Serial No. 480,190
In the Netherlands August 28, 1940

Section 1, Public Law 690, August 8, 1946.
Patent expires August 28, 1960

8 Claims. (Cl. 315—96)

The invention relates more particularly to a radio receiver in which a small incandescent pilot lamp which serves, for example, for the illumination of the tuning scale of the receiver, is connected in series with the filament of one or more amplifying tubes.

As is well known, the resistance of the filament of an amplifying tube in cold condition and therefore at the moment when the tube is being switched into circuit is in general considerably smaller than the resistance during normal operation, with the result that immediately after the tube has been put into operation there may occur an excessively high voltage at the incandescent lamp connected in series with the said filament, which may cause the burning-out of the incandescent lamp.

It has previously been proposed to protect in such a case the incandescent lamp by shunting it by a relay contact which is only opened, after the receiver has been switched into circuit, at such a moment that the filaments of the amplifying tubes have attained approximately their operating temperature.

This method of protection is frequently, however, too expensive and, in addition, it can only be utilized if the filament voltage of the lamp is comparatively low.

According to the invention, the said drawbacks are avoided by connecting, for the purpose of protecting the incandescent lamp against excessive voltages, one or more series-connected blocking-layer rectifiers in parallel with the incandescent lamp, the countervoltage of this or the joint countervoltages of these blocking-layer rectifiers corresponding, at least approximately, to the highest permissible voltage that is, maximum rated voltage, of the incandescent lamp.

If the filaments of the amplifying tubes are supplied with alternating current, at least two blocking-layer rectifiers which are oppositely connected in series, are connected in parallel with the incandescent lamp.

The invention will be explained more fully with reference to the accompanying drawing.

Figure 1 represents the current-voltage characteristic of a blocking-layer rectifier.

Figures 2 and 3 represent circuit-arrangements of the device according to the invention for direct-current supply and for alternating-current supply respectively.

Figure 1 represents the current $i$ in amperes passing through a blocking-layer rectifier, for example a selenium rectifier, as a function of the applied voltage $V$ in volts. This type of rectifier conducts current in one direction more readily than in the opposite or counterdirection, hereinafter referred to, respectively, as the "conducting" and "blocking" directions. For a more detailed discussion of this type of rectifier and its characteristics, reference may be had to an article by Van Geel, entitled "Blocking layer rectifiers," in Philips Technical Review (Holland), vol. 4, No. 4, April 1939, pages 100–105.

If a direct-current voltage of a polarity which corresponds to the conducting direction of transmission is applied to the rectifier, a current is set up even at a low voltage, as appears from the right-hand portion $a$ of the characteristic shown in Fig. 1. If, however, a slight voltage of opposite polarity which corresponds to the blocking direction is applied to the rectifier, a noticeable current does not occur as may be seen from the left-hand portion $b$ of the characteristic. It is not until this voltage of opposite polarity surpasses a determined value $V_s$ that there occurs a noticeable current shown by the curve portion $c$ which increases very rapidly with a further slight increase of the voltage. The said voltage $V_s$ is the so-called countervoltage of the block-layer rectifier, the value of which may be modified by the choice of the conductor and semi-conductor which form the blocking layer and by the formation of the blocking layer within wide limits (from about 2 to 20 volts).

According to the invention, the above-mentioned property of block-layer rectifiers is used for the protection of a circuit element which is sensitive to excessive voltages.

In Figure 2, which represents diagrammatically the circuit arrangement of a device according to the invention, 1, 2 and 3 denote the series-connected filaments of a number of indirectly heated amplifying tubes 1', 2' and 3'. An incandescent lamp 4 serving for lighting purposes is connected in series with these filaments. The connecting terminals to be connected to the source of direct current are denoted by 5 and 6.

According to the invention, a block-layer rectifier 7 is connected in parallel with the incandescent lamp, and this in such manner that if the terminals 5 and 6 are correctly connected to the source of direct current, that is to say with the correct polarity, there exists across the rectifier a voltage of a polarity such that the current flow through the rectifier is in the blocking direction of the rectifier, whereas the countervoltage of the rectifier corresponds to the ordinary operating voltage of the incandescent lamp.

If the voltage prevailing at the incandescent lamp corresponds to the ordinary operating voltage or is lower than this voltage, substantially no current flows through the rectifier since the countervoltage of the rectifier is not surpassed. The production of a higher voltage at the incandescent lamp, as might be possible immediately after the switching into circuit, is prevented by the rectifier since, when the countervoltage of the blocking-layer rectifier is surpassed, current will pass through the rectifier (curve c of Fig. 1). The resistance of the rectifier is thereby decreased with the result that the voltage drop across the series-connection of the filaments 1, 2 and 3 is increased and that across pilot lamp 4 is decreased.

A particular advantage of the circuit arrangement shown in Figure 2 is that the incandescent lamp only emits light in the case of the correct polarity since with a wrong polarity the resistance of the rectifier is so small, as will be clear upon considering Figure 1, that only a small current flows through the lamp. In this way it is therefore possible to obtain an indication acting without any delay about the correct or incorrect connection of a radio receiving set or the like which is supplied from a direct-current supply.

Figure 3 represents a circuit arrangement similar to that of Figure 2 but designed for being supplied from an alternating current supply.

For the protection of an incandescent pilot lamp 4 connected in series with filaments 1, 2 and 3 two blocking-layer rectifiers 8 and 9, which are oppositely connected in series, are connected in parallel with the incandescent lamp. In this case the rectifiers must be so chosen that the countervoltage of each of the rectifiers corresponds to the operating voltage of the incandescent lamp.

Each of the blocking-layer rectifiers represented in Figures 2 and 3 may be replaced by two or more blocking-layer rectifiers connected in series in the same sense, if this is necessary, in view of the operating voltage of the incandescent lamp for obtaining a sufficient countervoltage. By the same sense is meant that the series connected rectifiers are arranged in a manner such that their blocking directions, for example, are in the same direction, as distinguished from the opposed series connection shown for the rectifiers 8 and 9 in Fig. 3. In the former case the voltage at which just a noticeable current does not yet flow through the rectifiers is equal to the total of the countervoltages of each of the rectifiers separately.

With apparatus which is suitable both for direct current and for alternating current supply it is advisable, although frequently unnecessary, to short-circuit one of the rectifiers upon passing from alternating current to direct current since with direct current supply the correct polarity of the direct current mains may be ascertained from the fact whether the lamp lights up or not.

What I claim is:

1. In a radio receiver, a plurality of electron discharge tube heater elements and a pilot lamp connected to a power supply line, and rectifier means for materially reducing the voltage across said lamp during initial operation and for increasing the voltage across said lamp during subsequent operation.

2. In a radio receiver, a plurality of electron discharge tube heater elements connected to a power supply line, a pilot lamp connected in said supply line in series with at least one of said heater elements, and rectifier means shunted across said pilot lamp for materially reducing the voltage across said lamp during initial operation and for increasing the voltage across said lamp during subsequent operation.

3. The combination, in a radio receiver, of a power supply source for energizing the receiver, an incandescent scale-illumination lamp adapted to be energized from said source, and a blocking-layer rectifier connected in shunt across the lamp to protect the latter from excessive voltages that may be developed thereacross.

4. The combination, in a radio receiver, of a D. C. power supply source for energizing the receiver, an incandescent scale-illumination lamp adapted to be energized from said source, and a blocking-layer rectifier connected in shunt across the lamp to protect the latter from excessive voltages that may be developed thereacross, the rectifier being so poled with respect to the D. C. source that the current of the latter flows through the rectifier in the blocking direction of the rectifier.

5. The combination, in a radio receiver, of a D. C. power supply source for energizing the receiver, an incandescent scale-illumination lamp adapted to be energized from said source, and a blocking-layer rectifier connected in shunt across the lamp and so poled with respect to the D. C. source that the lamp is protected from excessive voltages that may be developed thereacross, whereas if the polarity of the source were to be reversed the fact that the source is incorrectly connected to the receiver would be indicated by reason of a small current flow through the lamp.

6. The combination, in a radio receiver, of an A. C. power supply source for energizing the receiver, an incandescent scale-illumination lamp adapted to be energized from said source, and a pair of blocking-layer rectifiers connected in shunt across the lamp in series opposed relation.

7. In a radio receiver, a plurality of electron discharge tube heater elements and a pilot lamp connected to a power supply line, and rectifier means for materially reducing the voltage across said lamp during initial operation and for increasing the voltage across said lamp during subsequent operation, said rectifier means comprising a block-layer rectifier having the characteristic of conducting current in one direction more readily than in the counterdirection, the voltage necessary to make the rectifier conductive in said counterdirection corresponding approximately to the operating voltage of the pilot lamp.

8. The arrangement defined in claim 7 wherein the heater elements and the pilot lamp are connected in series across the power supply line.

BERNARDUS DOMINICUS
HUBERTUS TELLEGEN.

REFERENCES CITED

The following references are of record in the file of this patent:

UNITED STATES PATENTS

| Number | Name | Date |
|---|---|---|
| 1,765,396 | Betts | June 24, 1930 |
| 2,325,789 | Miller | Aug. 3, 1943 |

FOREIGN PATENTS

| Number | Country | Date |
|---|---|---|
| 549,346 | Great Britain | Nov. 17, 1942 |